(12) United States Patent
Park et al.

(10) Patent No.: US 12,442,861 B2
(45) Date of Patent: Oct. 14, 2025

(54) APPARATUS FOR MEASURING BATTERY VOLTAGE AND CONTROL METHOD THEREOF

(71) Applicant: HYUNDAI MOBIS CO., LTD., Seoul (KR)

(72) Inventors: Joon Ho Park, Seoul (KR); Seul Ki Rom Kim, Gwacheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 178 days.

(21) Appl. No.: 18/452,788

(22) Filed: Aug. 21, 2023

(65) Prior Publication Data

US 2024/0077541 A1  Mar. 7, 2024

(30) Foreign Application Priority Data

Sep. 1, 2022  (KR) .................. 10-2022-0110992

(51) Int. Cl.
  *G01R 31/3835*  (2019.01)
  *G01R 31/396*  (2019.01)
(52) U.S. Cl.
  CPC ....... *G01R 31/3835* (2019.01); *G01R 31/396* (2019.01)
(58) Field of Classification Search
  CPC .............. G01R 31/3835; G01R 31/396; G01R 19/16538; G01R 19/16542; G01R 19/14; G01R 19/2506; G01R 19/30; G01R 31/389; H01M 2010/4271; H01M 10/425; H01M 10/482; H01M 16/006; H01M 50/569; H01M 10/48
  See application file for complete search history.

(56) References Cited

U.S. PATENT DOCUMENTS

| | | | | |
|---|---|---|---|---|
| 6,356,624 B1* | 3/2002 | Apfel | ................ | G01R 19/1659 |
| | | | | 379/27.01 |
| 2015/0207349 A1* | 7/2015 | Miyajima | ................ | H02H 7/18 |
| | | | | 320/118 |
| 2020/0203702 A1* | 6/2020 | Park | ...................... | H02J 7/0013 |
| 2022/0021230 A1* | 1/2022 | Chiu | ........................ | H02H 7/18 |
| 2022/0187381 A1* | 6/2022 | Kim | ................... | H01M 50/505 |
| 2023/0179004 A1* | 6/2023 | Zhao | .................... | H02J 7/0068 |
| | | | | 320/134 |

FOREIGN PATENT DOCUMENTS

WO  WO-2011050191 A1 *  4/2011  .......... H01M 10/425

\* cited by examiner

*Primary Examiner* — Lee E Rodak
*Assistant Examiner* — Zannatul Ferdous
(74) *Attorney, Agent, or Firm* — NSIP Law

(57) ABSTRACT

An apparatus for measuring voltage in a battery including battery cells connected in series includes a positive voltage sensing circuit to detect each voltage of the battery cells, received through sensing terminals, within a positive voltage range, a reverse voltage protection circuit including protection circuits, the printed circuits including first ends respectively connected to the plurality of sensing terminals different from each other, and second ends connected to each other, a boosting resistor including a first end connected to at least one electrode of the battery, and a reverse voltage sensing circuit to detect a voltage between the first node at which the second ends of the protection circuits are connected to each other and a second node to which a second end of the boosting resistor is connected, and based on the detection, output a signal indicating whether a reverse voltage is generated in the battery.

12 Claims, 5 Drawing Sheets

APPARATUS FOR MEASURING BATTERY VOLTAGE AND CONTROL METHOD THEREOF

CROSS-REFERENCE TO RELATED APPLICATION(S)

The present application claims priority to Korean Patent Application No. 10-2022-0110992, filed Sep. 1, 2022, the entire contents of which are incorporated herein for all purposes by this reference.

BACKGROUND

1 Field

The disclosure relates to a battery voltage measuring apparatus for measuring a voltage of a battery cell and a method of controlling the same.

2. Description of Related Art

A fuel cell used in eco-friendly vehicles refers to a device that generates electrical energy based on an electrochemical reaction between a fuel and an oxidizer and may, for example, include a hydrogen fuel cell using hydrogen as the fuel to generate electrical energy.

The eco-friendly vehicle may perform various voltage controls, such as voltage balancing of each cell, through a voltage sensing circuit that measures the positive voltage of each cell of the fuel cell.

When fuel or air supplied to the fuel cell is insufficient, a reverse voltage is generated. The reverse voltage may shorten the cell's life and cause an abnormal operation of a vehicle mounted with the fuel cell. Therefore, the eco-friendly vehicle needs to measure the fuel cell's reverse voltage and the positive voltage through the voltage sensing circuit.

However, when the voltage sensing circuit is used to measure both the positive voltage and the reverse voltage of the fuel cell, problems arise in that the area consumption and design complexity of the voltage sensing circuit are increased and the precision of voltage sensing is decreased.

The matters described as the related art are merely intended to promote the understanding of the background of the disclosure, but should not be accepted as recognition of the prior art that has already been known to a person having ordinary knowledge in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an apparatus for measuring voltage in a battery including battery cells connected in series is disclosed. The apparatus comprises a positive voltage sensing circuit configured to detect each voltage of the plurality of battery cells, received through a plurality of sensing terminals, within a positive voltage range, a reverse voltage protection circuit comprising a plurality of protection circuits, the plurality of protection circuits comprising first ends respectively connected to the plurality of sensing terminals different from each other, and second ends connected to each other, a boosting resistor comprising a first end connected to at least one electrode of the battery, and a reverse voltage sensing circuit configured to detect a voltage between the first node at which the second ends of the plurality of protection circuits are connected to each other and a second node to which a second end of the boosting resistor is connected, and based on the detection, output a signal indicating whether a reverse voltage is generated in the battery.

Each of the plurality of battery cells may comprise a fuel cell.

The positive voltage sensing circuit may comprise at least one analog-to-digital converter configured to measure each voltage of the plurality of battery cells.

Each of the plurality of protection circuits may control a conductive state between the sensing terminal and the first node based on the voltage of the sensing terminal to which the first end is connected.

Each of the plurality of protection circuits may be configured to allow a feedback current to flow from the first node to the sensing terminal based on a negative voltage of the sensing terminal to which the first end is connected and then return to the first node via the boosting resistor.

The boosting resistor may be configured to allow the feedback current to flow from one electrode of the battery to the second node to generate a boosting voltage for controlling the plurality of sensing terminals to have a positive voltage.

At least one electrode of the battery may correspond to a negative terminal of the battery, and the second end of the boosting resistor may be connected to an external voltage source.

Each of the plurality of protection circuits may comprise a resistor connected to at least one of the plurality of sensing terminals, and a diode connected between the resistor and the first node.

The diode may comprise an anode connected to the first node, and a cathode connected to the resistor.

Each of the plurality of protection circuits may comprise a resistor connected to at least one of the plurality of sensing terminals, and a P-channel metal oxide semiconductor (PMOS) transistor connected between the resistor and the first node.

A conductive state of the PMOS transistor may be controlled based on a difference in voltage between two sensing terminals among the plurality of sensing terminals.

The apparatus may further comprise a reverse voltage detecting resistor connected between the first node and the second node.

The reverse voltage sensing circuit may further be configured to detect the voltage of the reverse voltage detecting resistor to identify whether the reverse voltage is generated in the battery, and the reverse voltage sensing circuit may comprise a negative terminal connected to the first node, and a positive terminal connected to the second node.

In another general aspect, an apparatus for measuring voltage in a battery including a plurality of battery cells connected in series, is disclosed. The apparatus comprises a positive voltage sensing circuit configured to detect voltages of the plurality of battery cells, received through a plurality of sensing terminals, within a positive voltage range, a reverse voltage protection circuit comprising a plurality of protection circuits, the plurality of protection circuits comprising first ends respectively connected to the plurality of sensing terminals different from each other, and second ends connected to each other, and a boosting resistor comprising a first end connected to at least one electrode of the battery.

The positive voltage sensing circuit is further configured to detect within the positive voltage range a voltage applied between the first node at which the second ends of the plurality of protection circuits are connected to each other and a second node to which a second end of the boosting resistor is connected, and based on the detection, output a signal indicating whether a reverse voltage is generated in the battery.

The positive voltage sensing circuit may comprise at least one analog-to-digital converter configured to measure each voltage of the plurality of battery cells.

The apparatus may further comprise a reverse voltage detecting resistor connected between the first node and the second node.

The positive voltage sensing circuit may be configured to detect the voltage of the reverse voltage detecting resistor to identify whether the reverse voltage is generated in the battery, and the positive voltage sensing circuit may comprise a positive terminal connected to the first node, and a negative terminal connected to the second node.

Each of the plurality of protection circuits may be configured to allow a feedback current to flow from the first node to the sensing terminal based on a negative voltage of the sensing terminal to which the first end is connected and then return to the first node via the boosting resistor.

The boosting resistor may allow the feedback current to flow from one electrode of the battery to the second node to generate a boosting voltage for controlling the plurality of sensing terminals to have a positive voltage.

In yet another general aspect, a method of controlling an apparatus for measuring voltage in a battery including a plurality of battery cells, is disclosed. The method comprises detecting within a positive voltage range each voltage of the plurality of battery cells received from the battery through a plurality of sensing terminals, controlling a switching device connected between at least one of the plurality of sensing terminals and an internal node to have a conductive state based on a reverse voltage generated in the battery, feeding a current of the internal node back via a boosting resistor based on the conductive state of the switching device; and detecting a voltage between the internal node and the boosting resistor to identify whether the reverse voltage is generated in the battery.

BRIEF DESCRIPTION OF THE DRAWINGS

FIG. 6 is a flowchart showing a method of controlling a battery voltage measuring apparatus according to an embodiment of the disclosure.

DETAILED DESCRIPTION

Figure 1:
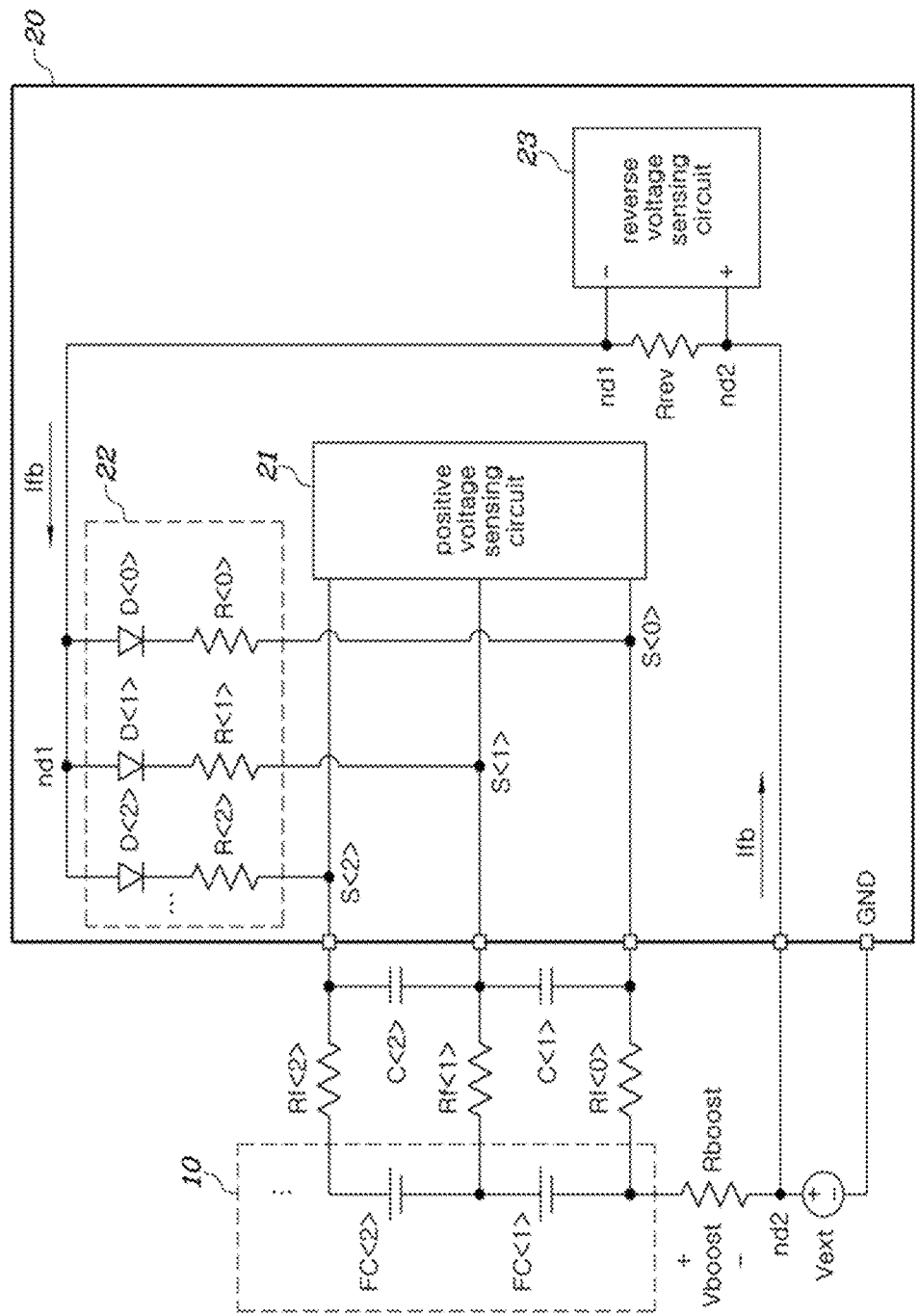
FIG. 1 is a diagram showing a battery voltage measuring apparatus according to an embodiment of the disclosure.

Hereinafter, embodiments of the disclosure will be described in detail with reference to the accompanying drawings, in which the same or similar elements are denoted by the same reference numerals even though they are depicted in different drawings and redundant descriptions thereof will be avoided.

In the following description of examples, the term "preset" means that the numerical value of a parameter is determined in advance when the parameter is used in a process or algorithm. According to examples, the numerical value of a parameter may be set when a process or algorithm starts or may be set during a period in which the process or algorithm is executed.

The terms "first," "second," etc. are used in distinguish between various elements, but the elements are not limited by these terms. For example, a first element may be termed a second element, and the second element may be termed the first element.

It will be appreciated that, when one element is referred to as being "connected" or "coupled" to another element, the element can be directly connected or coupled to the other element or there is an intervening element therebetween. On the other hand, it will be understood that, when an element is referred to as being "directly connected" or "directly coupled" to another element, there are no intervening elements therebetween.

Below, the disclosure will be described in more detail by way of examples. These examples are for illustrative purposes only, and are not intended to limit the scope of the disclosure.

FIG. 1 is a diagram showing a battery voltage measuring apparatus according to an embodiment of the disclosure.

As shown in FIG. 1, a battery voltage measuring apparatus may include a battery 10 and a sensing semiconductor device 20.

The battery 10 may include a plurality of battery cells FC<1:N>connected in series with opposite polarities to each other. In this embodiment, each of the plurality of battery cells FC<1:N> may be implemented by a fuel cell (where, 'N' may be set to any natural number greater than or equal to 2).

The plurality of battery cells FC<1:N> may be different in a voltage range according to whether operations are normal. For example, the plurality of battery cells FC<1:N> may have a positive voltage range of 0V to 4V during normal operations and a range of −4V to 0V when a reverse voltage is generated due to a fault condition.

Capacitors C<1:N> may be connected between both terminals of the plurality of battery cells FC<1:N>, and resistors Rf<0:N> may be connected between the plurality of battery cells FC<1:N> and the capacitor C<1:N>.

The sensing semiconductor device 20 may include a positive voltage sensing circuit 21, a reverse voltage protection circuit 22, and a reverse voltage sensing circuit 23. The sensing semiconductor device 20 may be implemented as a semiconductor device for a battery management system (BMS) of eco-friendly vehicles and the like, but not limited thereto.

The positive voltage sensing circuit 21 may detect each voltage of the plurality of battery cells FC<1:N>, which is received through the plurality of sensing terminals (S<0:N>), within a positive voltage, and output a detection result. For example, the positive voltage sensing circuit 21 may detect each voltage of the plurality of battery cells FC<1: N>corresponding to a range of 0V to 5V for each sensing channel, and output the detection result to a motor controller (not shown) or the like.

In this case, the positive voltage sensing circuit 21 may include at least one analog-to-digital converter (ADC) to measure each voltage of the plurality of battery cells FC<1:

N>. For example, the positive voltage sensing circuit 21 may include a plurality of ADCs respectively corresponding to the plurality of battery cells FC<1:N>, or may include a multiplexer and one ADC.

The reverse voltage protection circuit 22 may include a plurality of resistors R<0:N> and a plurality of diodes D<0:N>, and the plurality of resistors R<0:N> and the plurality of diodes D<0:N> may be configured as a plurality of protection circuits.

Each of the plurality of protection circuits may include one resistor R and one diode D connected in series. In this case, the plurality of protection circuits may include first ends respectively connected to a plurality of sensing terminals S<0:N>different from one another, and second ends connected to one another at a first node nd1. In more detail, the resistor R may be connected to one among the plurality of sensing terminals S<0:N>, and the diode D may be connected between the resistor R and the first node nd1. In this case, the diode D may have an anode connected to the first node nd1, and a cathode connected to the resistor R.

Each of the plurality of protection circuits may control a conductive state of the diode D connected between the first node nd1 and the sensing terminal S to which the first end is connected, based on the voltage of the sensing terminal S to which the first end is connected.

Accordingly, when the sensing terminal S to which the first end of each of the plurality of protection circuits is connected has a negative voltage, i.e., when the reverse voltage is generated in the battery 10, a feedback current Ifb may be output from the first node nd1 to the sensing terminal S to which the first end is connected.

In this case, the feedback current Ifb output to the sensing terminal S to which the first end is connected may be reinput to each of the plurality of protection circuits through the first node nd1 via the boosting resistor Rboost.

The boosting resistor Rboost may be positioned outside the sensing semiconductor device 20, and include a first end connected to a negative terminal of the battery 10 and a second end connected to a second node nd2. An external voltage source that outputs an external voltage Vext has a first end connected to the second node nd2, and a second end connected to the ground GND.

When the reverse voltage is generated in the battery 10, the boosting resistor Rboost may allow the feedback current Ifb to flow from the negative terminal of the battery 10 to the second node nd2, thereby generating a boosting voltage Vboost for controlling the plurality of sensing terminals S<0:N> to have the positive voltage.

Thus, the reverse voltage protection circuit 22 according to an embodiment uses the boosting voltage Vboost to raise the voltage of the plurality of sensing terminals S<0: N>higher than the ground voltage GND when the reverse voltage is generated in the battery 10, thereby preventing the positive voltage sensing circuit 21 from being damaged when the reverse voltage is generated.

The reverse voltage sensing circuit 23 detects the voltage of a reverse voltage detecting resistor Rrev connected between the first node nd1 and the second node nd2 to identify whether the reverse voltage is generated in the battery 10, thereby outputting a signal indicating whether the reverse voltage is generated in the battery 10 based on an identification result.

In this case, the negative terminal—of the reverse voltage sensing circuit 23 may be connected to the first node nd1, and the positive terminal+ of the reverse voltage sensing circuit 23 may be connected to the second node nd2.

The positive voltage sensing circuit 21 needs to precisely measure the positive voltage corresponding to a normal operating condition for each battery cell FC<1:N>. However, there is no need to precisely measure the reverse voltage corresponding to a fault condition unlike the positive voltage, and thus the reverse voltage sensing circuit 23 may detect whether the reverse voltage is generated with regard to the whole of the plurality of battery cells FC<1:N>.

Accordingly, the sensing semiconductor device 20 according to an embodiment is decreased in the area consumption and design complexity of the voltage sensing circuit for the battery cells, and increased in the precision of the voltage sensing.

Figure 2:
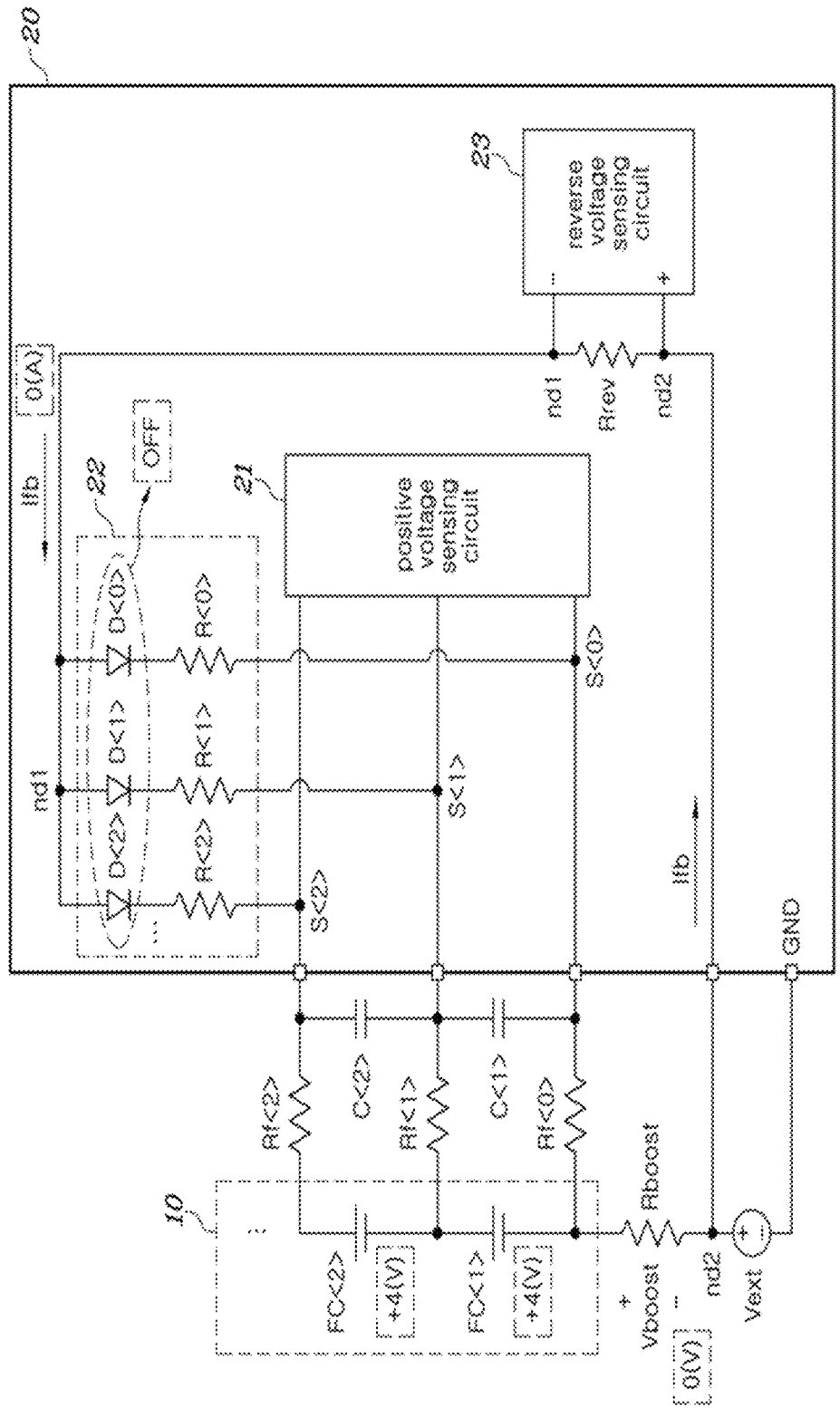
FIGS. 2 and 3 are diagrams showing operations of a battery voltage measuring apparatus according to an embodiment of the disclosure based on whether a reverse voltage is generated in a battery.
Figure 3:
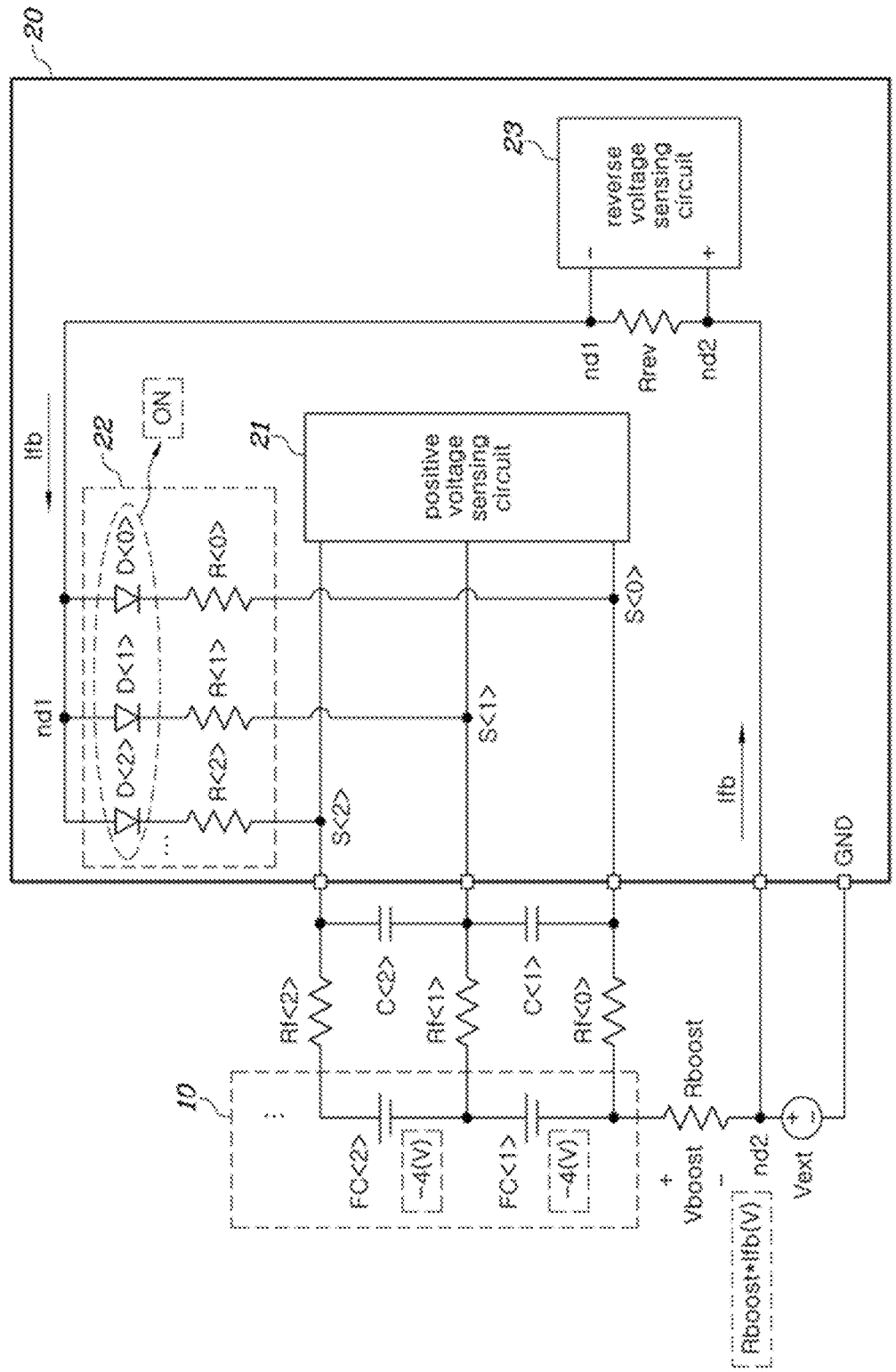

FIGS. 2 and 3 are diagrams showing operations of a battery voltage measuring apparatus according to an embodiment of the disclosure based on whether a reverse voltage is generated in a battery. FIG. 2 shows a case where the reverse voltage is not generated in the battery, and FIG. 3 shows a case where the reverse voltage is generated in the battery.

Referring to FIG. 2, the battery cells FC<1:2>have a voltage of +4V, which falls within the positive voltage range. In this case, the diodes D<0:2>are all turned off by a threshold voltage. Therefore, the feedback current Ifb does not flow in the boosting resistor Rboost, and the boosting voltage Vboost is 0V.

Referring to FIG. 3, the battery cells FC<1:2>have a voltage of −4V, which falls within the reverse voltage range. In this case, at least one of the diodes D<0:2> may be turned on as the voltage of the sensing terminal S<0:2> is varied.

Accordingly, the feedback current Ifb flows in the boosting resistor Rboost, and the boosting voltage Vboost has a level of Rboost*Ifb(V). The boosting voltage Vboost raises the voltage of the sensing terminal S<0:2>higher than the voltage of the ground GND, thereby preventing the positive voltage sensing circuit 21 from being damaged when the reverse voltage is generated.

Further, the feedback current Ifb flows even in the reverse voltage detecting resistor Rrev, and thus the reverse voltage sensing circuit 23 identifies whether the reverse voltage is generated based on the voltage of the reverse voltage detecting resistor Rrev.

Figure 4:
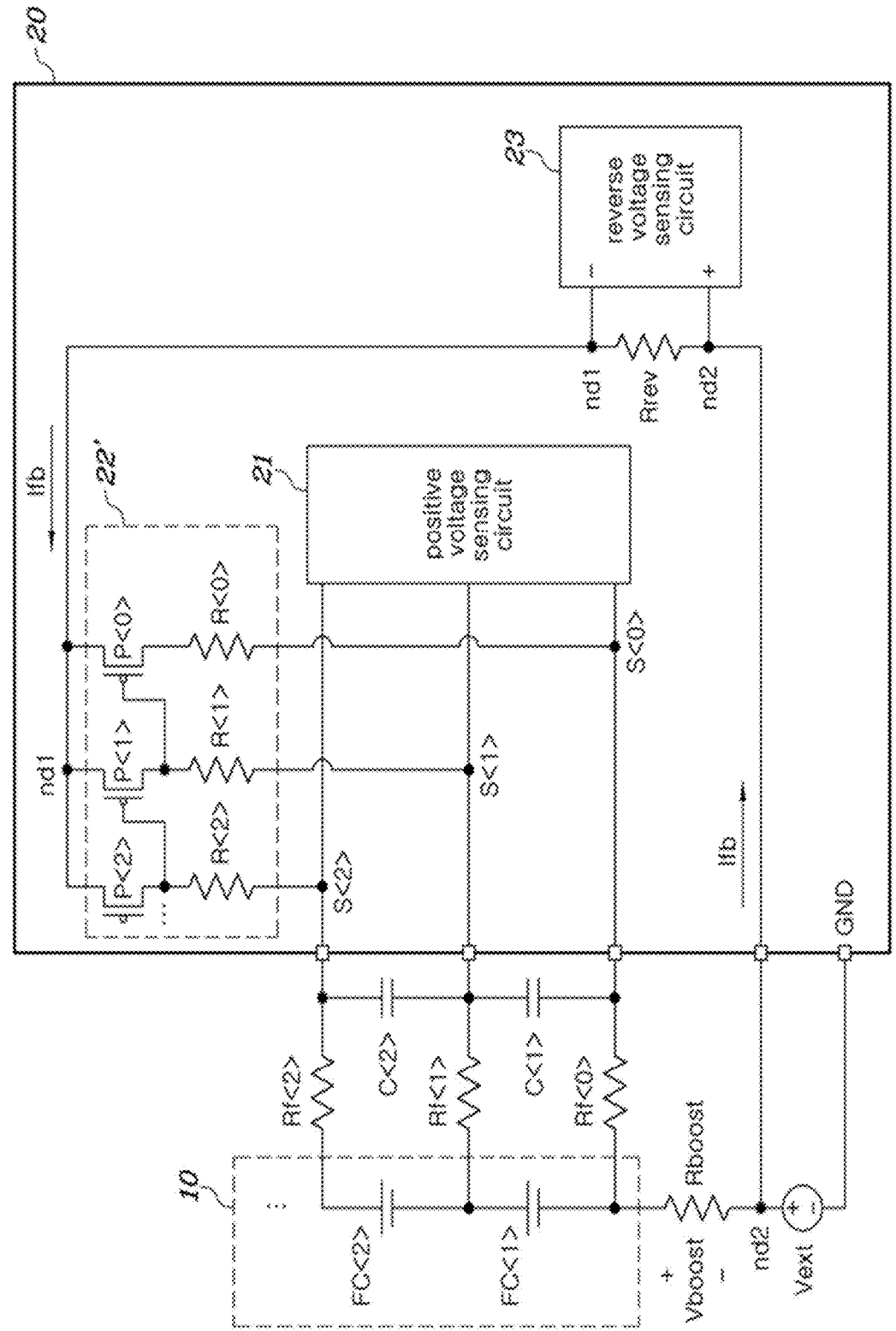
FIG. 4 is a diagram showing a battery voltage measuring apparatus according to another embodiment of the disclosure.

FIG. 4 is a diagram showing a battery voltage measuring apparatus according to another embodiment of the disclosure.

A reverse voltage protection circuit 22' shown in FIG. 4 may be configured differently from the reverse voltage protection circuit 22 of FIG. 1.

The reverse voltage protection circuit 22' includes a plurality of resistors R<0:N>, and a plurality of P-channel metal oxide semiconductor (PMOS) transistors P<0:N>, and the plurality of resistors R<0:N> and the plurality of PMOS transistors P<0:N> may be configured as a plurality of protection circuits.

Each of the plurality of protection circuits may include one resistor R and one PMOS transistor P connected in series. In this case, the plurality of protection circuits may include first ends respectively connected to the plurality of sensing terminals S<0:N>different from one another, and second ends connected to one another at the first node nd1. In more detail, the resistor R may be connected to one of the plurality of sensing terminals S<0:N>, and the PMOS transistor P may be connected between the resistor R and the first node nd1. In this case, the conductive state of the PMOS transistor P may be controlled based on a difference in voltage between two sensing terminals among the plurality of sensing terminals S<0:N>. For example, the PMOS transistor P<1> may be turned on when the voltage of the sensing terminal S<2> is lower than the voltage of the sensing terminal S<1>.

Accordingly, each of the plurality of protection circuits controls the conductive state of the PMOS transistor P connected between the sensing terminal S and the first node nd1 based on the voltage of the sensing terminal S.

Figure 5:
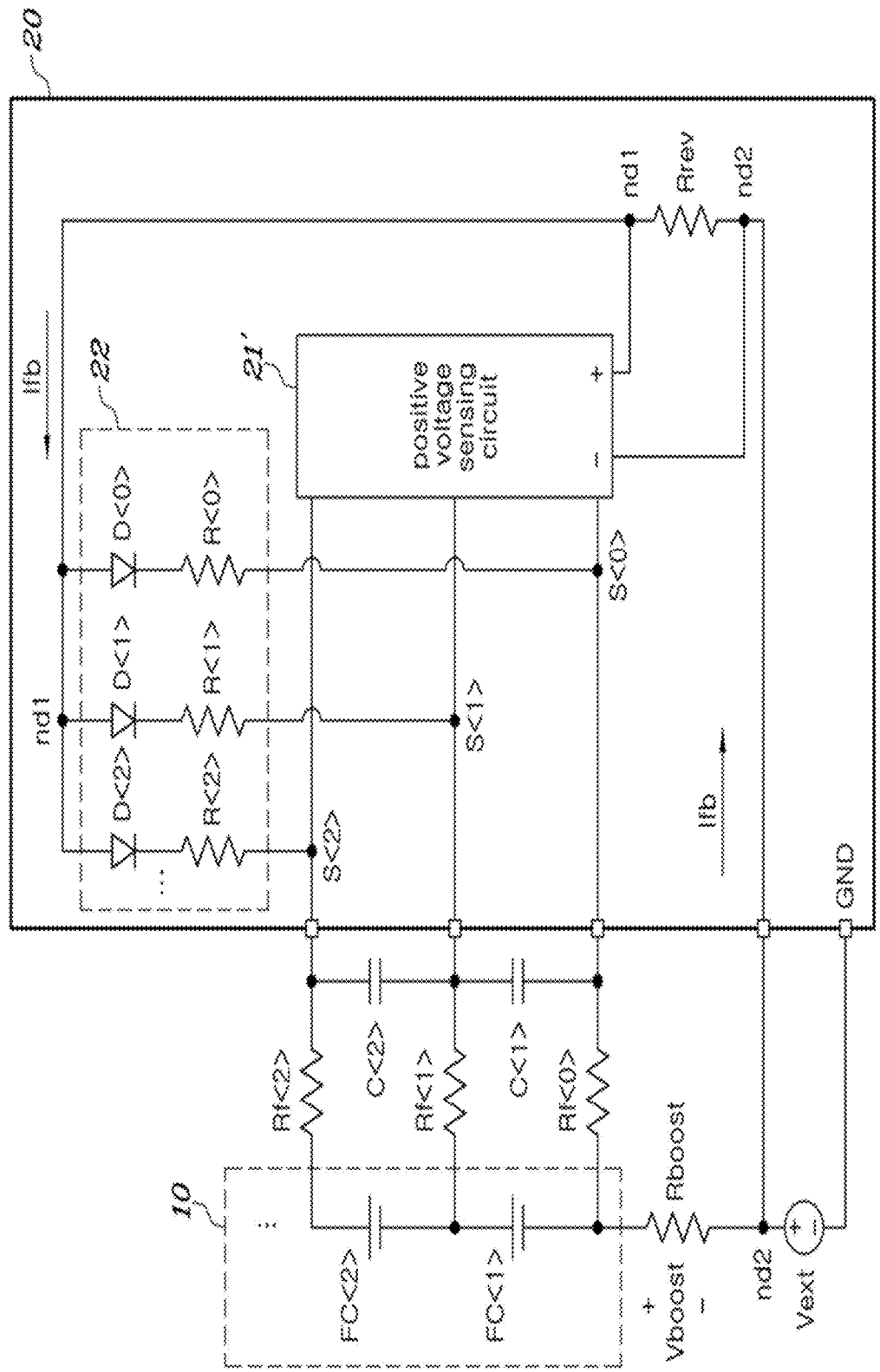
FIG. 5 is a diagram showing a battery voltage measuring apparatus according to still another embodiment of the disclosure.

FIG. 5 is a diagram showing a battery voltage measuring apparatus according to still another embodiment of the disclosure.

FIG. 5 illustrates a positive voltage sensing circuit 21' that detects the voltages of the plurality of battery cells FC<1: N>, which are received through the plurality of sensing terminals S<0:N>, within the positive voltage range.

Unlike the positive voltage sensing circuit 21 of FIG. 1, the positive voltage sensing circuit 21' of FIG. 5 can identify whether the reverse voltage is generated in the battery 10 by detecting the voltage of the reverse voltage detecting resistor Rrev connected between the first node nd1 and the second node nd2 within the positive voltage range. Thus, the positive voltage sensing circuit 21' may output a signal indicating whether the reverse voltage is generated in the battery 10. In this case, the positive voltage sensing circuit 21' may have a positive terminal+connected to the first node nd1, and a negative terminal—connected to the second node nd2.

The positive voltage sensing circuit 21' according to an embodiment can identify whether the reverse voltage is generated in the battery 10 without the reverse voltage sensing circuit 23 shown in FIG. 1 by adding one sensing channel to the sensing channels of the positive voltage sensing circuit 21 of FIG. 1.

FIG. 6 is a flowchart showing a method of controlling a battery voltage measuring apparatus according to an embodiment of the disclosure.

Referring to FIG. 6, the positive voltage sensing circuit 21 or 21' may detect the voltages of the plurality of battery cells FC<1:N>received from the battery 10 through the plurality of sensing terminals S<1:N>within the positive voltage range (S101).

Then, it is identified whether the reverse voltage is generated in the battery 10, based on the voltages of the plurality of battery cells FC<1:N>(S103).

When it is identified that the reverse voltage is generated in the battery 10 (YES in S103), the reverse voltage protection circuit 22 or 22' may control the switching device (the diode of FIG. 1 or the PMOS transistor of FIG. 4) connected between one of the plurality of sensing terminals S<1:N> and the first node nd1 to be in a conductive state (S105).

When the switching device is in the conductive state, the current in the internal node nd1, i.e., the feedback current lfb may be fed back via the boosting resistor Rboost (S107). In more detail, the feedback current lfb flows from the first node nd1 to the plurality of sensing terminals S<1:N>, and returns to the first node nd1 via the battery 10, the boosting resistor Rboost, the second node nd2, and the reverse voltage detecting resistor Rrev.

Then, the reverse voltage sensing circuit 23 or the positive voltage sensing circuit 21' detects the voltage of the reverse voltage detecting resistor Rrev connected between the first node nd1 and the second node nd2 to which the second end of the boosting resistor Rboost is connected, thereby identifying whether the reverse voltage is generated in the battery 10 (S109).

What is claimed is:

1. An apparatus for measuring voltage in a battery comprising a plurality of battery cells connected in series, the apparatus comprising:
    a positive voltage sensing circuit configured to detect each voltage of the plurality of battery cells, received through a plurality of sensing terminals, within a positive voltage range;
    a reverse voltage protection circuit comprising a plurality of protection circuits, the plurality of protection circuits comprising first ends respectively connected to the plurality of sensing terminals different from each other, and second ends connected to each other,
    wherein each of the plurality of protection circuits controls a conductive state between a sensing terminal and the first node based on a voltage of the sensing terminal to which the first end is connected, and
    wherein each of the plurality of protection circuits is configured to allow a feedback current to flow from the first node to each of the sensing terminals based on a negative voltage of each of the sensing terminals to which the first end is connected and then return to the first node via the boosting resistor;
    a boosting resistor comprising a first end connected to at least one electrode of the battery,
    wherein the boosting resistor is configured to allow the feedback current to flow from one electrode of the battery to the second node to generate a boosting voltage for controlling the plurality of sensing terminals to have a positive voltage; and
    a reverse voltage sensing circuit configured to:
        detect a voltage applied between a first node at which the second ends of the plurality of protection circuits are connected to each other and a second node to which a second end of the boosting resistor is connected; and
        based on the detection of the voltage applied between the first and second nodes, output a signal indicating whether a reverse voltage is generated in the battery.

2. The apparatus of claim 1,
wherein each of the plurality of battery cells comprises a fuel cell.

3. The apparatus of claim 1,
wherein the positive voltage sensing circuit comprises at least one analog-to-digital converter configured to measure each voltage of the plurality of battery cells.

4. The apparatus of claim 1,
wherein at least one electrode of the battery corresponds to a negative terminal of the battery, and
wherein the second end of the boosting resistor is connected to an external voltage source.

5. The apparatus of claim 1,
wherein each of the plurality of protection circuits comprises:
    a resistor connected to at least one of the plurality of sensing terminals; and
    a diode connected between the resistor and the first node.

6. The apparatus of claim 5,
wherein the diode comprises an anode connected to the first node and a cathode connected to the resistor.

7. The apparatus of claim 1,
wherein each of the plurality of protection circuits comprises:
    a resistor connected to at least one of the plurality of sensing terminals; and
    a P-channel metal oxide semiconductor (PMOS) transistor connected between the resistor and the first node.

8. The apparatus of claim 7,
wherein a conductive state of the PMOS transistor is controlled based on a difference in voltage between two of the sensing terminals among the plurality of sensing terminals.

9. The apparatus of claim 1, further comprising a reverse voltage detecting resistor connected between the first node and the second node.

10. The apparatus of claim 9,
wherein the reverse voltage sensing circuit is further configured to detect a voltage of the reverse voltage detecting resistor to identify whether the reverse voltage is generated in the battery, and
wherein the reverse voltage sensing circuit comprises a negative terminal connected to the first node, and a positive terminal connected to the second node.

11. An apparatus for measuring voltage in a battery comprising a plurality of battery cells connected in series, the apparatus comprising:
a positive voltage sensing circuit comprising at least one analog-to-digital converter configured to measure each voltage of the plurality of battery cells, each voltage being received through a plurality of sensing terminals, within a positive voltage range;
a reverse voltage protection circuit comprising a plurality of protection circuits, the plurality of protection circuits comprising first ends respectively connected to the plurality of sensing terminals different from each other, and second ends connected to each other,
wherein each of the plurality of protection circuits is configured to allow a feedback current to flow from the first node to a sensing terminal based on a negative voltage of the sensing terminal to which the first end is connected and then return to the first node via the boosting resistor; and
a boosting resistor comprising a first end connected to at least one electrode of the battery,
wherein the boosting resistor allows the feedback current to flow from one electrode of the battery to the second node to generate a boosting voltage for controlling the plurality of sensing terminals to have a positive voltage; and
a reverse voltage detecting resistor connected between the first node and the second node,
wherein the positive voltage sensing circuit is further configured to:
detect, within the positive voltage range, a voltage of the reverse voltage detecting resistor to identify whether a reverse voltage is generated in the battery, the voltage being applied between a first node at which the second ends of the plurality of protection circuits are connected to each other and a second node to which a second end of the boosting resistor is connected; and
output a signal indicating whether the reverse voltage is generated in the battery, and
wherein the positive voltage sensing circuit comprises a positive terminal connected to the first node and a negative terminal connected to the second node.

12. A method of controlling an apparatus for measuring voltage in a battery including a plurality of battery cells connected in series, the method comprising:
detecting, within a positive voltage range, each voltage of the plurality of battery cells received from the battery through a plurality of sensing terminals using at least one analog-to-digital converter;
detecting a voltage between a first node, at which second ends of a plurality of protection circuits respectively connected to the sensing terminals are connected to each other, and a second node to which a boosting resistor is connected, to identify whether a reverse voltage is generated in the battery;
in response to detecting the reverse voltage, controlling each of the plurality of protection circuits to allow a feedback current to flow from the first node to the sensing terminals based on a negative voltage at the sensing terminals;
returning the feedback current from the sensing terminals to the first node via the boosting resistor; and
generating a boosting voltage through the boosting resistor based on the feedback current to control the plurality of sensing terminals to have a positive voltage.

* * * * *